March 1, 1966

O. CHRISTOFFERSEN 3,238,309

HEARING AID APPARATUSES

Filed Nov. 14, 1962

2 Sheets-Sheet 1

INVENTOR
OVE CHRISTOFFERSEN

BY Dicke & Craig
ATTORNEYS

INVENTOR
OVE CHRISTOFFERSEN

BY Dicke + Craig
ATTORNEYS

United States Patent Office 3,238,309
Patented Mar. 1, 1966

3,238,309
HEARING AID APPARATUSES
Ove Christoffersen, 9 Cypernsvej,
Copenhagen, Denmark
Filed Nov. 14, 1962, Ser. No. 237,626
Claims priority, application Denmark, Nov. 25, 1955, 3,849/55; May 31, 1956, 1,932/56; July 7, 1956, 2,425/56
6 Claims. (Cl. 179—107)

This is a continuation-in-part of my application Ser. No. 613,672, filed October 3, 1956, now abandoned, relating to hearing aid apparatuses.

It is a purpose of the invention to provide a hearing aid and spectacle combination which can quickly be adapted to fit the intended user.

It is a further purpose of the invention to provide an eyeglass hearing aid construction having a temple member adapted to be connected to the eyeglass frame in which a completely self-contained hearing aid apparatus is provided within a first portion of the temple member, the other portion is in the form of a temple tip, and in which the two temple portions are connectable by telescopic means.

It is a further object of the invention to provide a combination of hearing aid and eyeglasses in which a self-contained hearing aid apparatus is provided within a temple member of the eyeglass, the temple member being interchangeably connected with the eyeglass front frame so as to enable the user to save the substantial expenses of the hearing aid apparatus when buying a new set of lenses or frames.

It is a further purpose of the invention to provide an eyeglass hearing aid apparatus having a temple member adapted to be connected to the eyeglass frame, in which the eyeglass frame is provided with at least one relatively short temple tip and the temple member itself is in the form of a relatively long housing structure containing substantially all of the components of the hearing aid, so as to have the character of a completely self-contained hearing aid apparatus.

Still a further purpose of the invention is to provide a hearing aid and eyeglass combination having a temple member including a relatively long portion which provide a completely self-contained hearing apparatus, and a temple tip which enables quick adaption to fit any intended wearer and which can be used in a manner that is not noticeable to other persons.

Figure 2:
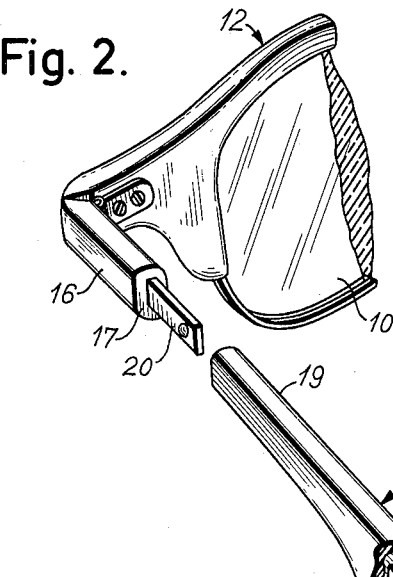
Figure 1:
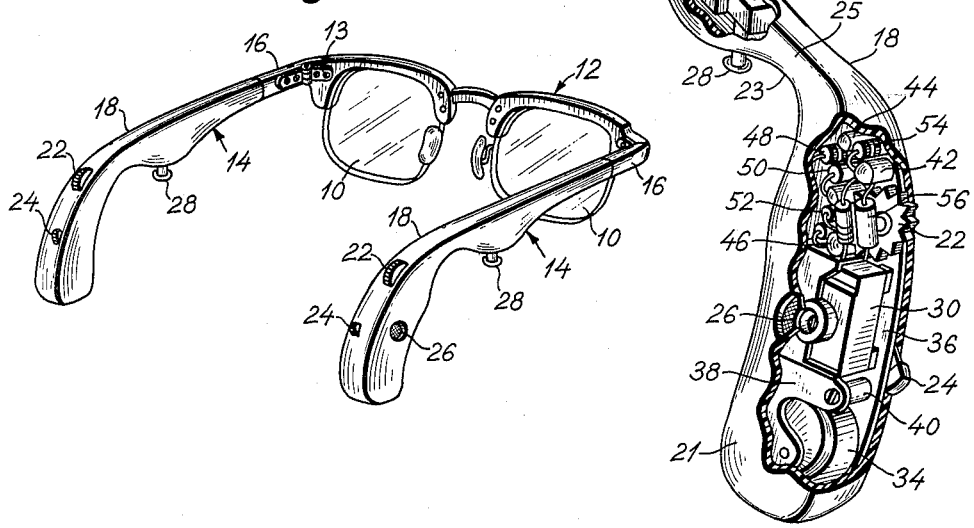
Figure 3:
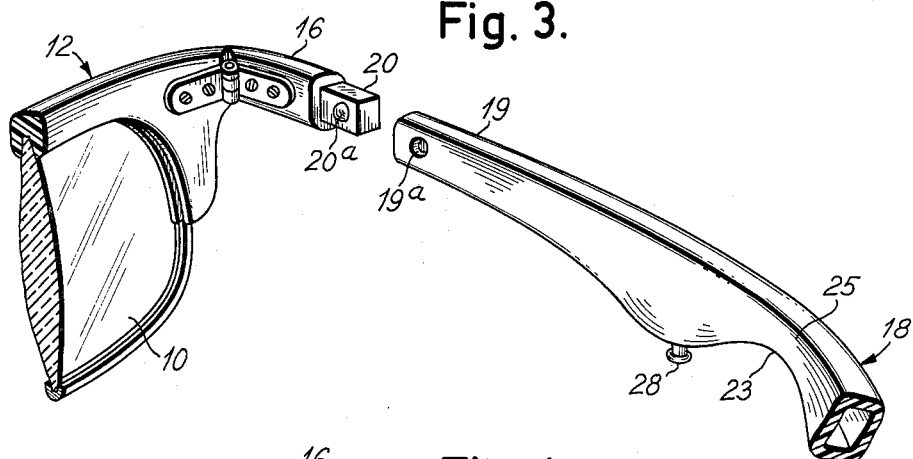
Figure 4:
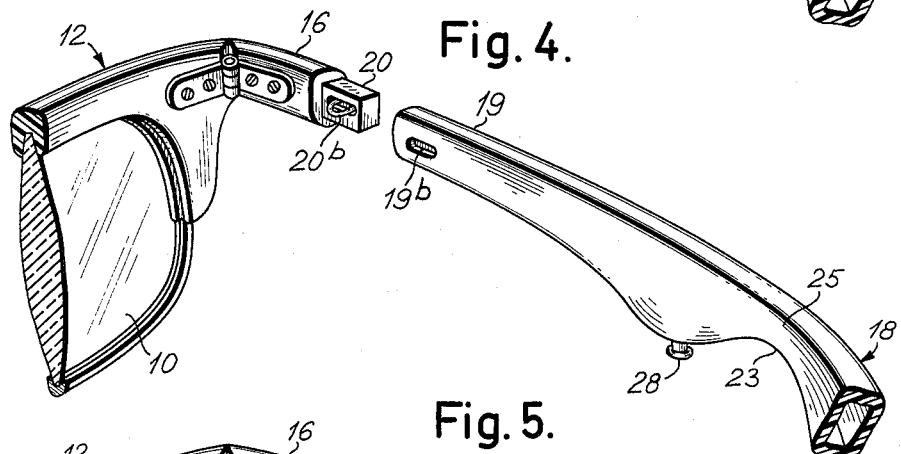
Figure 5:
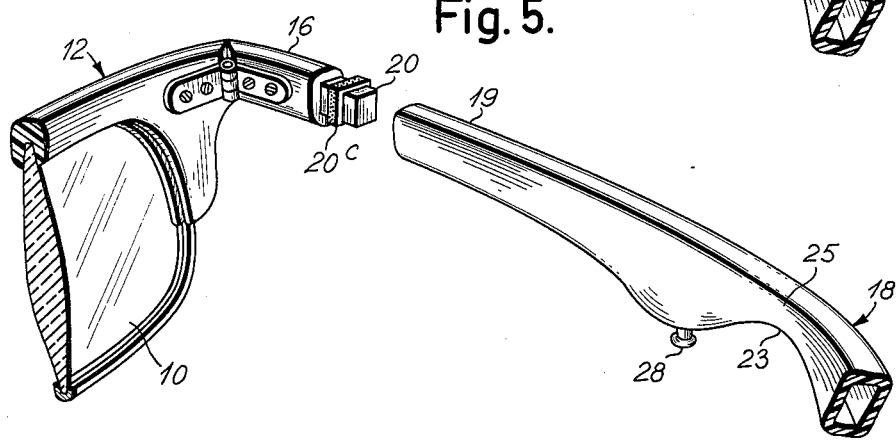

Further objects and advantages of the invention will appear from the following specification in connection with the accompanying drawing in which FIGURE 1 is a perspective view of a hearing aid and spectacle combination according to the invention, FIGURE 2 is a perspective exploded view, partly in section, of the left hand side of the hearing aid and spectacle combination shown in FIGURE 1 on an enlarged scale, FIGURE 3 is an exploded perspective view of a part of the right hand side of the hearing aid and spectacle combination shown in FIGURE 1 illustrating one modification of telescope connection means, FIGURE 4 is an exploded perspective view in similarity with FIGURE 3 illustrating another modification of telescope connector means, and FIGURE 5 is still a further perspective exploded view in similarity with FIGURE 3 illustrating a third modification of the connector means.

With reference to the drawing I provide in broad terms in a hearing aid and spectacle combination in which the glasses 10 are supported in a front frame and the front frame is pivotally connected to temple bars, generally referred to by 14, the improvement which most specifically is illustrated in FIGURE 2 essentially consisting of a temple bar having two portions 16 and 18 with telescopic means operatively connecting the two portions.

One of the temple bar portions, i.e. the portion 16, is relatively shorter and provides a temple tip which is pivotally secured to the front frame. The other one of said temple bar portions, i.e. the portion 18, is relatively longer and has an elongated housing structure with the part of the housing structure remote from the telescopic means 20 being of such shape as to fit over the wearer's ear. Hearing aid means with substantially all components including battery, microphone, receiver, and amplifier means thereof is as illustrated in FIGURE 2 supported in the housing structure so as to provide a completely self-contained hearing aid apparatus within the temple portion 18.

Obviously, an eyeglass hearing aid construction is provided thereby which cannot only be quickly adapted to fit the intended wearer, for example by adjusting the length of the temple portion 18 by cutting off the front end so as to obtain the desired distance between the hinge and the curved portion to fit over the wearer's ear, but the invention also provides for economy. The substantial costs of an eyeglass hearing aid construction lie in the self-contained hearing aid apparatus within the template member which may involve up to one or several hundred dollars which cannot be expected to be paid over again every time the wearer buys a new set of lenses or frames. Obviously, the invention provides for the possibility of changing eyeglass frame still using the same self-contained hearing aid in the template member, the casing of which may be constructed by means of a siutable attractive plastic material of a color which will match such front frames as the wearer is normally using.

Still a further economic aspect of the invention is that the interchangeability of the self-contained hearing aid template member 18 with the short temple tip provides for the possibility that the wearer can borrow from the dealer another self-contained hearing aid template in the event that the hearing aid apparatus has to be sent to the factory for service and repair.

Obviously, the eyeglass hearing aid construction also provides for advantages with respect to distribution and retail sale, because the dealer can carry a stock of self-contained hearing aid template bars with appertaining temple tips and make the fitting on the spot without the necessity of having available any personnel experienced in electrical wiring.

More specifically, with reference to the drawing, the lense frame pair 12 of FIGURE 1 is provided with hinge parts, one of which is shown at 13 of FIGURE 1.

In FIGURE 1 each of the template members is supposed to include a completely self-contained hearing aid apparatus with control disc 22 for volume control, switch control lever 24 for switching on and off the power supply, sound receiver aperture 26, and outlet tube 28 to provide connection with an earpiece (not shown) through a plastic tube or the like.

Obviously, depending on the wearer's hearing defect, only one of the template members may include a self-contained hearing aid apparatus, in which case the other template member will be a dummy.

Preferably each of the relatively long template portions 18 which provide the self-contained hearing aid apparatus is in the form of a hollow shell having an inwardly open side which is closed by means of a plane or slightly curved cover of corresponding configuration which is secured in position after mounting of the components of the hearing aid apparatus, for example by means of a suitable bonding material.

The relatively long temple portion 18 extends into a tapered front part 19 which has an open end adapted to receive the telescope member 20. The rear end 21 of the template member 18 slopes downwardly so as to fit behind the ear of the wearer, and above the downwardly sloping portion 21 the lower wall of the template portion 18 curves upwardly at 23 to define a relatively narrow bridge portion 25 which will fit snugly behind the ear of the wearer.

In the housing defined by the structure substantially all the parts of a hearing aid apparatus are supported.

Behind the aperture 26 a microphone 30 is located in the rear downwardly sloping portion 21. A sound reproducer 32 is mounted on the other side of the narrow bridge portion 25 and has its outlet communicating with the downwardly projecting sound tube 28 which is adapted to be connected with the earpiece of the wearer. A battery 34 is supported at the lower end of the downwardly sloping portion 21 and is accessible for replacement through a removable portion of the wall structure (not shown) which may be adapted to be clicked into position and is removable by means of a finger nail.

As obvious from FIGURE 2, the hearing air apparatus with exception of the sound reproducer 22 is in the form of a compact structure located in the rear downwardly sloping portion 21 of the template member 18. The hearing air structure comprises a chassis plate 36 on which the switch control lever 24 as well as the control disc 22 for the volume control are supported; a second chassis plate 38 is by means of distance pieces 40 supported in spaced relationship to the chassis plate 36 to provide a space within which the microphone 30 and the battery 34 are supported.

The upper portion of the chassis plate 36 on which the volume control disc 22 is mounted effectively provides a mounting chassis for the amplification components of the hearing air apparatus which include transistors 42, 44 and 46, resistors 48, 50 and 52 and condensers 54 and 56 connected by means of electrical leads to provide amplification circuitry in a manner well known to those skilled in the art. Obviously, electrical output leads (not shown) extend from the output circuit of the amplification means to the sound reproducer 32.

The relatively short first template portion 16 which provides the template tip has at its point of merger with the telescope member 20 which is adapted to be received in the hollow end of the tapered front part 19 of the second temple member 18 a shoulder 17 adapted to engage the end of the tapered temple portion 19. The exterior dimensions of the end of the tapered temple portion 19 is preferably equal to the exterior dimensions of the templa tip 16, so that when the two temple portions are assembled, the assembly will hardly be visible, so that the hearing aid and spectacle combination can be worn in a manner that is not noticeable to other persons.

More specifically, the modification of FIGURE 2 provides a temple tip 16, the end or telescope member 20 of which has a cross section enabling the telescopic projection 20 to be received in the open end of the temple member 18 which together with the telescopic projection 20 forms therewith a complementary telescopic means. The assembly is, of course, made in such a manner that the end of the template member 18 abuts against the shoulder 20 of the temple tip, so that when the individual length of the two temple portions 18 and 16, respectively are adapted to the wearer, the assembled temple tip and temple bar structure with the self-contained hearing aid apparatus will fit the wearer.

The dimension of the telescopic member 20 may be so adapted to the dimension of the open end of the temple member 18 that a tight fit is provided, whereby the parts can be assembled by friction only.

A modification of the structure including lock means between the temple tip and the elongated temple member 18 is shown in FIGURE 3. In this embodiment a ball lock is provided in the form of a resiliently supported projecting ball 20a on the telescopic member 20 adapted to engage into a corresponding hole 19a in the elongated temple member.

In another modification illustrated in FIGURE 4 a wire spring 20b is supported on the telescopic member 20 adapted to engage into a slot 19b in the temple member 18.

Still a further modification is shown in FIGURE 5 which illustrates a band 20c of a suitable friction material such as a rubber band received in an annular groove of the telescopic member 20 and adapted to frictionally engage the interior wall of the aperture in the end of the template member 18.

It will be understood that further modifications are possible within the scope of the invention.

What I claim is:

1. As an article of manufacture for use in a hearing aid and spectacle combination, in which the glasses are supported in a front frame, and the front frame is pivotally connected to temple bars with a relatively long temple bar portion having an elongated housing structure with a part of said housing structure being of such shape as to fit over the wearer's ear and with an open end remote therefrom and having hearing aid means with substantially all components including battery, microphone, receiver and amplifier means thereof supported in said housing structure so as to constitute a self-contained hearing aid apparatus; a relatively short temple bar portion having means enabling it to be pivotally secured to said front frame at one end and having at its other end a shoulder and an extension of reduced cross section operable to fit in said open end of said housing structure to form therewith a complementary telescopic means operable to connect said short temple bar portion with said housing structure as a temple tip.

2. In a hearing aid and spectacle combination, in which the glasses are supported in a front frame,, and the front frame is pivotally connected to temple bars, the improvement essentially consisting of a temple bar consisting of two portions, one of said temple bar portions being relatively short and having means to enable it to be pivotally secured to said front frame, and the other of said temple bar portions being relatively long and having an elongated housing structure with an end being of such shape as to fit over the wearer's ear, said one temple bar portion being of a size determined by the wearer's requirements and said other temple bar portion being of a standard size, telescopic means operatively connecting said two temple bars with each other to provide a secure connection therebetween forming only a single predetermined length between the pivot means of said one temple bar portion and the part of the other temple bar portion fitting over the wearer's ears including first telescope means on one of said temple bar portions and second complementary telescope means on said second temple bar portion operable to releasably connect said temple bar portions, and hearing aid means with at least most of the components including battery, microphone, receiver and amplifier means thereof supported in said housing structure so as to constitute said other temple bar portion a readily exchangeable self-contained hearing aid devoid of any electrical connection with or through said front frame.

3. For use with an eyeglass frame:
   a composite separate temple structure having a front end, a rear end and a further portion adjacent said rear end operable to fit over the ear of the wearer and comprising
   at said front end a solid, relatively short portion with hinge means operable to connect said short portion with said eyeglass frame to effectively provide a temple tip and having at the end remote from said hinge means an extension of reduced cross section, and a second portion in the form of an elongated hollow housing structure forming said rear end and said further portion and having a front end which terminates in an aperture of a cross section substantially corresponding to the extension of said temple tip to constitute complementary assembly means for the two portions of said composite temple structure to provide, when said two portions are assembled, a hearing aid eyeglass having substantially all the parts of the hearing aid supported in said housing to effectively provide a self-contained hearing aid apparatus within said hollow housing structure.

4. In an eyeglass hearing aid apparatus having a temple member adapted to be connected to the eyeglass frame, in combination: a temple member having a first portion and a second portion, said first portion including an elongated wall structure defining a housing, having a rear part adapted to fit over the ear and extending into an elongated tubular front part having predetermined interior and exterior cross sections at its end, said second portion being of substantially shorter length than said first portion, means operable to hingedly connect said second portion with said eyeglass frame to effectively provide a hingedly connected temple tip having an end with a cross section substantially equal with the exterior cross section of said end of said first portion, telescopic means on said two portions to provide a telescopic connection between said temple tip and the interior of said front part of said first portion, and a hearing aid apparatus with substantially all the parts thereof including power supply, microphone, receiver, amplifier means and circuit means thereof connecting the same supported in said housing to thereby provide a completely self-contained hearing aid apparatus within said first portion.

5. In an eyeglass hearing aid apparatus having a temple member adapted to be hingedly connected to the eyeglass frame, in combination: a temple member having a relatively long first portion including an elongated wall structure defining a housing, having a rear part adapted to fit over the ear and extending into an open front end having an opening of a first predetermined interior cross section and an exterior dimension of a second predetermined cross section, and a relatively short second portion of substantially shorter length than said first portion and having means to enable the hinged connection thereof with said eyeglass frame to effectively provide a hingedly connected temple tip having an end with an exterior configuration substantially resembling said second cross section of said open front end of said first portion, a portion of decreased cross section extending beyond said temple tip end corresponding substantially to said interior cross section of said opening of said front end of said first portion to be received in said opening thereof to provide a telescopic connection between said temple tip and the front part of said first portion, and a hearing aid apparatus with substantially all the parts thereof including power supply, microphone, receiver, amplifier means and circuit means thereof connecting the same supported in said housing to thereby provide a completely self-contained hearing aid apparatus within said first portion.

6. In an eyeglass hearing aid apparatus having a temple member adapted to be hingedly connected to the eyeglass frame and including a portion adapted to fit over the ear of the wearer of the eyeglass which is spaced a certain distance from the eyeglass frame corresponding to the individual requirements of the wearer:

the improvement essentially consisting of a combined temple and hearing aid apparatus structure, in which the temple structure comprises:

a first portion including an elongated wall structure defining a housing having a rear end and a front end, and with a housing portion adjacent said rear end adapted to fit over the ear of the wearer of the eyeglass and with the front end of the housing terminating in an aperture with a predetermined cross section, at least most of the parts of said hearing aid apparatus including the power supply, the transducer, the amplifier means and the circuit means thereof being supported in said housing to effectively provide a substantially complete self-contained hearing aid apparatus within said first portion, and a second portion of substantially shorter length than said first portion and effectively providing a temple tip, including a body portion operable to provide a continuation of said first portion and an extension of reduced cross section substantially corresponding to the cross section of the aperture of said first portion and extending from one end of said temple tip, and pivot means at the other end of said temple tip and operable to hingedly connect said temple tip with said eyeglass frame, said temple tip being of such a length that when said temple tip is connected with said first portion with the temple tip extension of reduced cross section received in the aperture of said first portion to form said combined structure, the over-all distance between said pivot means and the housing portion which is adapted to fit over the ear of the wearer corresponds to the wearer's individual requirements.

References Cited by the Examiner

UNITED STATES PATENTS

| | | | |
|---|---|---|---|
| 2,930,858 | 3/1960 | Hollingsworth | 179—107 |
| 2,946,394 | 7/1960 | Smith | 179—107 |
| 3,119,903 | 1/1964 | Rosemond et al. | 179—107 |

ROBERT H. ROSE, *Primary Examiner.*

F. N. CARTEN, *Assistant Examiner.*